(12) United States Patent
Heo et al.

(10) Patent No.: US 9,167,523 B2
(45) Date of Patent: Oct. 20, 2015

(54) METHOD AND APPARATUS FOR CONSUMING LOW POWER BY TERMINAL IN MOBILE COMMUNICATION SYSTEM

(71) Applicant: Samsung Electronics Co. Ltd., Suwon-si, Gyeonggi-do (KR)

(72) Inventors: Dong-Cheol Heo, Seongnam-si (KR); Ravi Gupta, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 214 days.

(21) Appl. No.: 13/909,419

(22) Filed: Jun. 4, 2013

(65) Prior Publication Data
US 2014/0355500 A1 Dec. 4, 2014

(51) Int. Cl.
*H04W 52/02* (2009.01)
*H04L 29/06* (2006.01)

(52) U.S. Cl.
CPC ....... *H04W 52/0229* (2013.01); *H04L 65/1006* (2013.01); *H04L 65/1059* (2013.01); *H04L 65/1083* (2013.01); *H04L 65/80* (2013.01); *H04W 52/02* (2013.01); *Y02B 60/50* (2013.01)

(58) Field of Classification Search
None
See application file for complete search history.

(56) References Cited

U.S. PATENT DOCUMENTS

2012/0054354 A1* 3/2012 Sato .............................. 709/228
2014/0301258 A1* 10/2014 Belghoul ....................... 370/311

* cited by examiner

*Primary Examiner* — Benjamin H Elliott, IV
(74) *Attorney, Agent, or Firm* — Jefferson IP Law, LLP

(57) ABSTRACT

A method for operating a terminal using reduced power consumption in a mobile communication system is provided. The method includes receiving a signal, determining whether the received signal corresponds to a Session Initiation Protocol (SIP) update request message, if the received signal corresponds to an SIP update request message, sending the SIP update request message to an SIP processor in a communication processor; and handling the SIP update request message by the SIP processor.

14 Claims, 4 Drawing Sheets

METHOD AND APPARATUS FOR CONSUMING LOW POWER BY TERMINAL IN MOBILE COMMUNICATION SYSTEM

BACKGROUND OF THE INVENTION

1. Field of the Invention

The present invention relates to a mobile communication system. More particularly, the present invention relates to a method and apparatus for consuming low power by a terminal in a mobile communication system.

2. Description of the Related Art

Mobile communication systems have been developed to provide voice services while ensuring the user's activity. However, the mobile communication systems have gradually expanded their respective services from voice services to include data services. At present, the mobile communication systems have evolved to provide high-speed data services. However, mobile communication systems according to the related art suffer from a lack of resources. More advanced wireless communication systems are required to meet the increasing users' demand for high-speed services.

To meet these needs, standardization for a Long Term Evolution (LTE) communication system, one of the next-generation wireless communication systems under development, is underway in 3rd Generation Partnership Project (3GPP). Because the LTE system basically supports only the packet services, the LTE standard has proposed a Circuit Switched FallBack (CSFB) service, in which in order to provide a voice call to a user, upon receiving an incoming voice call, a terminal camping on an LTE network drops its connection to the LTE network, and accesses the legacy 3rd Generation (3G) network (or Circuit Switched (CS) network) to provide a voice call service. In addition to CSFB, the LTE standard has proposed a Voice over LTE (VoLTE) service as technology for supporting a voice call service in the LTE network. According to the VoLTE service, a terminal converts the user's voice into packet data and transmits the packet data across the LTE network.

As the LTE system applies the voice call service that uses the legacy 3G CS network, to the Packet Switched (PS) data network, a protocol for voice call control between a terminal and the network is required. To this end, a Session Initiation Protocol (SIP) protocol is used. The SIP protocol provides multiple functions, such as a message delivery function of sending a call to the other party when a user makes a call, a function of receiving and responding to a call message upon receiving the call message from the other party, a function of accepting, rejecting or dropping the call depending on the user's input, and a function of determining whether the terminal is normally connected to the network.

FIG. 1 illustrates a structure of a terminal according to the related art.

Referring to FIG. 1, the terminal includes an Application Processor (AP) 100, a Session Inter-Process Communication (SIPC) 120, and a Communication Processor (CP) 130. The Session Inter-Process Communication (SIPC) 120 operates for interworking between the AP 100 and the CP 130.

In the terminal, the SIP protocol is implemented in the AP 100.

It is assumed that an SIP message and/or a voice packet are received at the terminal from a network.

Upon receiving a voice packet from the network, a Packet Data Convergence Protocol (PDCP) filter 134 in the CP 130 of the terminal transfers the voice packet to a voice engine 132 via a Transfer Control Protocol/Internet Protocol (TCP/IP) 136 in the CP 130, and the voice engine 132 processes the voice packet, allowing the user to hear the voice.

Upon receiving an SIP message from the network, the PDCP filter 134 in the CP 130 sends the SIP message to an SIP stack 115 in the AP 100, so that an appropriate operation is performed for each message. For example, upon receiving the SIP message from the network, the PDCP filter 134 in the CP 130 may send the SIP message to the SIP stack 115 in the AP 100 by way of the TCP/IP 105 in the AP 100. The AP 100 may include an IMS library 110 comprising the SIP stack 115.

FIG. 2 is a flowchart illustrating an operation of a terminal according to the related art.

Referring to FIG. 2, in step 201, the PDCP filter 134 of the CP 130 included in the terminal receives an SIP message in a situation in which there is no user input. In step 203, the PDCP filter 134 sends the received SIP message to the SIP stack 115 in the AP 100, which is responsible for processing an SIP protocol, even in the situation in which there is no user input. In step 205, the SIP stack 115 in the AP 100 handles the received SIP message.

Because the terminal attempts to ensure the maximum performance and run time within the terminal limitations (e.g., limited size, processing power, and the like), reduction of the power consumption of the terminal is very important. However, because the SIP stack 115 used to control VoLTE voice calls exists in the AP 100, the AP 100 is responsible for generating an SIP message and handling a received SIP message. When the user takes an action of making (sending) or receiving a voice call, the AP 100 is enabled in order to activate a User Interface (UI) of the terminal. Therefore, the terminal does not need to additionally enable the AP 100 when the terminal needs to handle an SIP message.

However, when there is a need to handle an SIP message in a situation in which there is no user input, the terminal should enable the AP 100 in order to handle the SIP message, thereby causing the terminal to consume relatively more power.

Therefore, a need exists for a method and apparatus for consuming low power by a terminal, in which when there is a need to process an Session Initiation Protocol (SIP) protocol in a situation in which there is no user input.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus for consuming low power by a terminal, in which when there is a need to process an Session Initiation Protocol (SIP) protocol in a situation in which there is no user input, the SIP protocol is processed not in an Application Processor (AP), but in a Communication Processor (CP).

Another aspect of the present invention is to provide a method and apparatus for consuming low power by a terminal, in which an AP is enabled only in a situation in which there is a user input (e.g., only when the user takes an action of making or receiving a voice call).

In accordance with an aspect of the present invention, a method for operating a terminal using reduced power consumption in a mobile communication system is provided. The method includes receiving a signal, determining whether the received signal corresponds to a SIP update request message, if the received signal corresponds to an SIP update request message, sending the SIP update request message to an SIP processor in a communication processor, and handling the SIP update request message by the SIP processor.

In accordance with another aspect of the present invention, an apparatus for operating a terminal using reduced power consumption in a mobile communication system is provided. The apparatus includes a receiver for receiving a signal, a filter for determining whether the received signal corresponds to an SIP update request message, and if the received signal corresponds to an SIP update request message, sending the SIP update request message to an SIP processor in a communication processor, and the SIP processor for handling the SIP update request message.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term 'terminal' as used herein may refer to a phone that a user can carry with him or her, and on which a voice service is possible over the packet network. The terminal may include, for example, a smart phone, a cellular phone, a tablet computer, and the like, and can access the network using, for example, Wi-Fi communications, 3rd Generation (3G) communications, Long Term Evolution (LTE) communications, and the like.

In accordance with an exemplary embodiment of the present invention, while processing a VoLTE call, a terminal prevents, if possible, an AP from waking up (e.g., transitioning to an active state) to handle a message (e.g., an SIP update request message) which is received from the network and used to determine whether the terminal normally accesses the network. As a result, the power consumption of the terminal may be reduced.

Figure 3:
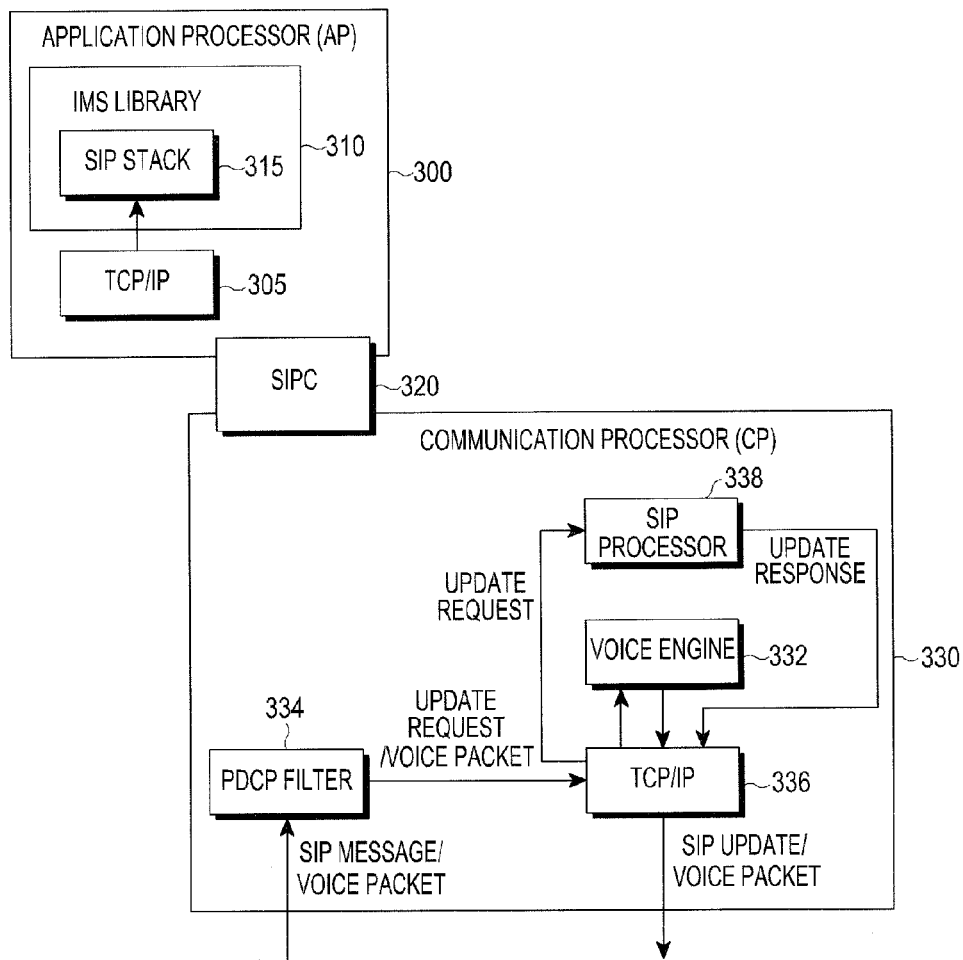
FIG. 3 illustrates a structure of a terminal according to an exemplary embodiment of the present invention.

FIG. 3 illustrates a structure of a terminal according to an exemplary embodiment of the present invention.

Referring to FIG. 3, the terminal includes an Application Processor (AP) 300, a Session Inter-Process Communication (SIPC) 320 and a Communication Processor (CP) 330.

The AP 300 includes an IP Multimedia Core Network Subsystem (IMS) stack 315 in an IMS library 310. The AP 300 may also include a Transfer Control Protocol/Internet Protocol (TCP/IP) 305. In accordance with an exemplary embodiment of the present invention, the IMS stack 315 does not handle SIP update messages.

The IMS stack 315 is in charge of signaling related to network elements, and bearer setup. The IMS stack 315 may exchange multimedia-type content such as photos, video clips, sound clips, and the like with the network using session-based messages, because the IMS stack 315 processes various types of packet data services based on the IP transport protocol.

In addition, during initial Voice over LTE (VoLTE) call setup, the IMS stack 315 in the AP 300 transfers a parameter for handling an SIP update request message to an SIP processor 338 in the CP 330 by session refresh Inter Process Communication (IPC). The parameter for handling an SIP update request message may include 'Timer Value', 'IP Address Info.', 'Destination Port Info.' and the like, which are defined in Table 1 below.

TABLE 1

| Field | Length (bytes) | Description |
| --- | --- | --- |
| SUB_CMD | 1 | Sub-command code (0x07) |
| CMD_TYPE | 1 | EXECUTE (0x01) |
| OPERATION | 1 | 0x01: START |
|  |  | 0x02: STOP |
|  |  | 0x03: INIT |
| SESSION_ID | 4 | Session ID |
| REFRESHER | 1 | 0x01: UE |
|  |  | 0x02: Network |

TABLE 1-continued

| Field | Length (bytes) | Description |
|---|---|---|
| REFRESH_TIMER_E | 2 | Session Refresh Time for Timer E (sec) |
| REFRESH_TIMER_F | 2 | Session Refresh Time for Timer F (sec) |
| REFRESH_TIMER_K | 2 | Session Refresh Time for Timer K (sec) |
| REFRESH_TIMER_J | 2 | Session Refresh Time for Timer J (sec) |
| REFRESH_TIMER_VAL | 2 | Session Refresh timer val |
| REMOTE_IP_TYPE | 1 | 0x01: IP v4<br>0x02: IP v6 |
| REMOTE_IP | 16 | Specifies the IP address to be transmitted. The address must be given in the format wxyz, where wxyz are all integers between 0 and 255. |
| REMOTE_PORT | 2 | Destination Port Number (Valid integer numbers must be in the range 1024 to 65535) |
| IMS_BUFFER_LEN | 4 | Length of UPDATE SIP msg |
| IMS_BUFFER | IMS_BUFFER_LEN | UPDATE SIP MSG (1000 bytes max) |

The SIPC 320 is a protocol for handling message exchange between the AP 300 and the CP 330. The CP 330 may also include an SIPC that is responsible for the communication (or message exchange).

Data exchanged between the AP 300 and the CP 330 may include Circuit Switched Video Telephony (CS VT), Packet Switched Video Telephony (PS VT), Pulse Code Modulation (PCM) data, PS data, and the like that use a raw channel, such as the SIPC message. The data exchanged between the AP 300 and the CP 330 may also include a formatted packet channel and an RFS packet channel. Each channel is sent to a related processing block in a driver. If control and data delivery between the AP 300 and the CP 330 is needed, the SIPC 320 may be used.

If the AP 300 sends a message via the SIPC 320, an SIPC block of the CP 330 receives the message. Thereafter, the SIPC block analyzes the message and delivers the analysis results to a related block in the form of a message. Each of the parameters included in the message is stored in the form defined in advance with the processing block, and thereafter delivered (e.g., later on).

Referring to Table 1, an IMS REFRESH SESSION Message is defined. The IMS REFRESH SESSION Message is determined based on 0x07 in a Sub CMD field that the message corresponds to an IMS refresh session message. The SIPC block calls a relevant function depending on 0x1 (start), 0x2 (stop), and 0x3 (init) in an Operation field.

The CP 330 includes a voice engine 332, a PDCP filter 334, a TCP/IP 336, and the SIP processor 338.

Figure 1:
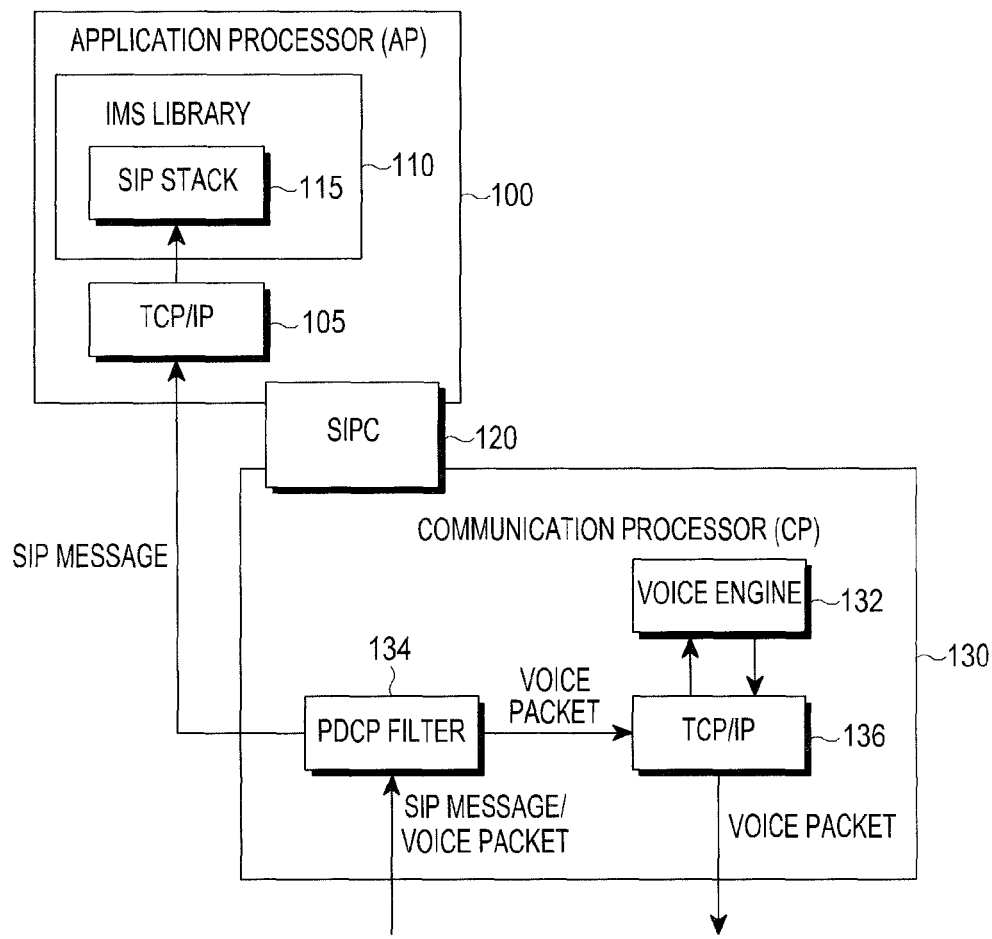
FIG. 1 illustrates a structure of a common terminal according to the related art.
Figure 2:
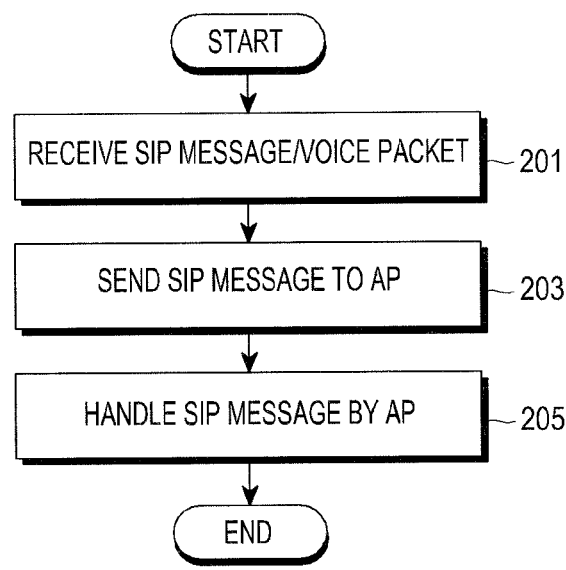
FIG. 2 is a flowchart illustrating an operation of a common terminal according to the related art.

The PDCP filter 334 performs filtering on the received voice packet and/or SIP message. Upon receiving an SIP message from the network, the PDCP filter 134 according to the related art (e.g., as illustrated in FIG. 1) sends the received SIP message from the CP 130 of the terminal to the SIP stack 115 in the AP 100.

However, according to exemplary embodiments of the present invention, the PDCP filter 334 operates as follows.

An exemplary embodiment of the present invention in which there is no terminal user input will is described below.

According to exemplary embodiments of the present invention, upon receiving a voice packet from the network, the PDCP filter 334 transfers the received voice packet to the voice engine 332 via the TCP/IP 336. The voice engine 332 processes the received voice packet and transmits the received voice packet via the TCP/IP 336. Processing the voice packet received from the network may be formed in a similar or same way as the procedure according to the related art.

In contrast, upon receiving an SIP message, the PDCP filter 334 determines whether the received SIP message corresponds to an SIP update request message. In other words, the PDCP filter 334 extracts an SIP update request message. If the received SIP message corresponds to an SIP update request message, the PDCP filter 334 sends the SIP update request message to the SIP processor 338 in the CP 330 via the TCP/IP 336, instead of sending the SIP update request message to the AP 300.

Upon receiving the SIP update request message, the SIP processor 338 generates a response message (e.g., an SIP update response message) to the SIP update request message, and sends the response message to the network via the TCP/IP 336.

Figure 4:
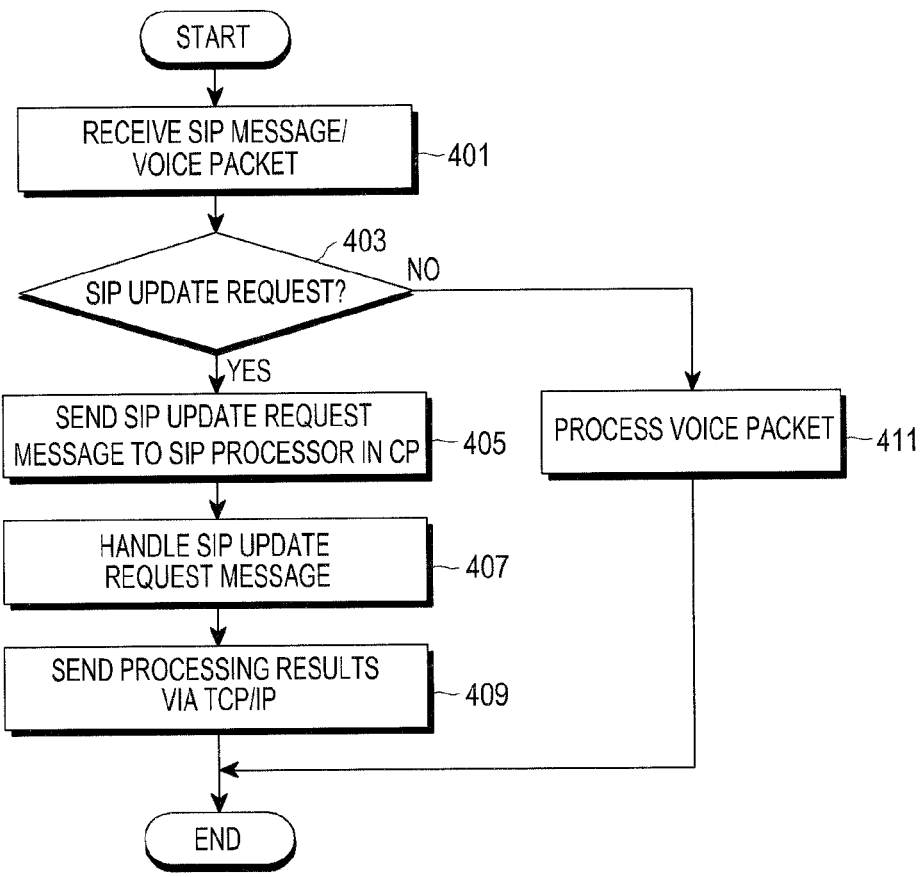
FIG. 4 is a flowchart illustrating an operation of a terminal according to an exemplary embodiment of the present invention.

FIG. 4 is a flowchart illustrating an operation of a terminal according an exemplary embodiment of the present invention.

Referring to FIG. 4, an operation of a terminal that consumes relatively low power (e.g., to process an SIP protocol) according an exemplary embodiment of the present invention is illustrated. It will be assumed that before step 401, during initial VoLTE call setup, the IMS stack 315 in the AP 300 transfers a parameter for handling an SIP update request message to the SIP processor 338 in the CP 330 by session refresh IPC.

In step 401, in a situation in which there is no terminal user input, the PDCP filter 334 receives an SIP message/voice packet from the network.

In step 403, the PDCP filter 334 determines whether the received SIP message corresponds to an SIP update request message based on an SIP protocol.

If the PDCP determines that the SIP message corresponds to an SIP update request message in step 403, then the PDCP proceeds to step 405 in which the PDCP filter 334 sends the SIP update request message to the SIP processor 338 in the CP 330 via the TCP/IP 336, instead of sending the SIP update request message to the AP 300.

In step 407, upon receiving the SIP update request message, the SIP processor 338 generates an SIP update response message in response to the SIP update request message.

In step 409, the SIP processor 338 sends the generated SIP update response message to the network via the TCP/IP 336.

Conversely, if the PDCP filter 334 determines that the received message does not correspond to an SIP update request message in step 403 (e.g., if the received message corresponds to a voice packet), then the terminal proceeds to step 411 in which the terminal allows the voice engine 332 to process the voice packet.

According to exemplary embodiments of the present invention, through this process, the AP is not required to wake up to handle an SIP update request message based on the SIP protocol during a VoLTE call, thereby contributing to a reduction in power consumption of the terminal.

Exemplary embodiments of the present invention may be implemented as computer-readable codes in non-transient computer-readable recording media. The non-transient computer-readable recoding media may include all kinds of recording devices storing computer-readable data. Examples of the recording media may include Read Only Memory (ROM), Random Access Memory (RAM), Compact Disk (CD)-ROM, magnetic tape, floppy disk, optical data storage device, and the like.

As is apparent from the foregoing description, according to exemplary embodiments of the present invention, the AP is not required to wake up to handle an SIP update request message upon receiving a VoLTE voice call, thereby contributing to a reduction in power consumption of the terminal during a VoLTE call.

If there is a need to process an SIP protocol in a situation in which there is no user input, the terminal processes the SIP protocol not in the AP but in the CP, thereby reducing the power consumption of the terminal.

For example, the terminal enables the AP only in the situation in which there is a user input (e.g., only when the user takes an action of making or receiving a voice call), thereby reducing the power consumption of the terminal.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a terminal in a mobile communication system, the method comprising:
   receiving a signal;
   determining whether the received signal corresponds to a session initiation protocol (SIP) update request message;
   if the received signal corresponds to an SIP update request message, sending the SIP update request message to an SIP processor in a communication processor without sending the SIP update request message to an application processor; and
   handling the SIP update request message by the SIP processor,
   wherein the application processor is in sleep mode if the received signal corresponds to the SIP update request message.

2. The method of claim 1, wherein during setup for a voice call over a packet network, the application processor transfers a parameter for handling an SIP update request message to the SIP processor in the communication processor.

3. The method of claim 2, wherein the application processor transfers the parameter to the SIP processor in the communication processor by a session refresh inter process communication (IPC).

4. The method of claim 1, wherein the handling of the SIP update request message by the SIP processor comprises:
   generating an SIP update response message in response to the SIP update request message; and
   sending the SIP update response message to a network via a transfer control protocol/internet protocol (TCP/IP).

5. The method of claim 1, wherein the terminal is in a state in which a user of the terminal enters no input.

6. The method of claim 5, wherein the terminal is in an inactive state.

7. The method of claim 1, wherein the sending of the SIP update request message comprises:
   if the received signal corresponds to an SIP update request message, sending the SIP update request message to the SIP processor in the communication processor, and
   if the received signal does not correspond to an SIP update request message, sending the received signal to an application processor.

8. An apparatus for operating a terminal in a mobile communication system, the apparatus comprising:
   a receiver for receiving a signal;
   a filter for determining whether the received signal corresponds to a session initiation protocol (SIP) update request message, and if the received signal corresponds to an SIP update request message, sending the SIP update request message to an SIP processor in a communication processor without sending the SIP update request message to an application processor; and
   the SIP processor for handling the SIP update request message,
   wherein the application processor is in sleep mode if the received signal corresponds to the SIP update request message.

9. The apparatus of claim 8, wherein during setup for a voice call over a packet network, the application processor transfers a parameter for handling an SIP update request message to the SIP processor in the communication processor.

10. The apparatus of claim 9, wherein the application processor transfers the parameter to the SIP processor in the communication processor by a session refresh inter process communication (IPC).

11. The apparatus of claim 8, wherein the SIP processor generates an SIP update response message in response to the SIP update request message, and sends the SIP update response message to a network via a transfer control protocol/internet protocol (TCP/IP).

12. The apparatus of claim 8, wherein the terminal is in a state in which a user of the terminal enters no input.

13. The apparatus of claim 12, wherein the terminal is in an inactive state.

14. The apparatus of claim 8, wherein if the received signal corresponds to an SIP update request message, the filter sends the SIP update request message to the SIP processor in the communication processor, and
   wherein if the received signal does not correspond to an SIP update request message, the filter sends the received signal to an application processor.

* * * * *